(12) United States Patent
Villanueva (10) Patent No.: US 10,794,495 B2
(45) Date of Patent: Oct. 6, 2020

(54) POWER-DRIVEN GATE VALVE

(71) Applicant: Gabriel Telles Villanueva, San Manuel, AZ (US)

(72) Inventor: Gabriel Telles Villanueva, San Manuel, AZ (US)

(*) Notice: Subject to any disclaimer, the term of this patent is extended or adjusted under 35 U.S.C. 154(b) by 0 days.

(21) Appl. No.: 15/154,856

(22) Filed: May 13, 2016

(65) Prior Publication Data

US 2017/0016551 A1 Jan. 19, 2017

Related U.S. Application Data

(60) Provisional application No. 62/165,946, filed on May 23, 2015.

(51) Int. Cl.
*F16K 3/02* (2006.01)
*F16K 31/50* (2006.01)

(52) U.S. Cl.
CPC ............ *F16K 3/0254* (2013.01); *F16K 31/50* (2013.01); *F16K 3/0272* (2013.01); *F16K 3/0281* (2013.01)

(58) Field of Classification Search
CPC ........ F16K 3/0254; F16K 31/50; F16K 3/314; F16K 3/0245; F16K 3/0272; F16K 3/0281
USPC ................ 251/326, 266, 291, 329, 251, 215
See application file for complete search history.

(56) References Cited

U.S. PATENT DOCUMENTS

| 377,611 | A | 2/1888 | Harley ................. E05B 1/0015 |
| 2,000,853 | A | 5/1935 | Lange ....................... F16K 3/02 |
| 2,060,571 | A | 11/1936 | Hanson ..................... F16K 3/02 |
| 2,075,123 | A * | 3/1937 | Lunken ................... F16K 3/314 |
| | | | 251/327 |
| 2,550,984 | A | 5/1951 | Ferguson .............. F16K 3/0209 |
| 2,797,062 | A * | 6/1957 | Otter ......................... F16K 3/28 |
| | | | 251/168 |
| 2,891,762 | A | 6/1959 | Kellogg ................. F16K 3/0281 |
| 2,936,667 | A | 5/1960 | Thorberg ................ F16B 35/06 |
| 3,033,517 | A | 5/1962 | Rovang ................. F16K 3/0281 |
| 3,319,661 | A | 5/1967 | Shindler ................. F16K 3/312 |
| 3,710,816 | A | 1/1973 | Prince ................... F16K 3/0281 |
| 3,749,114 | A | 7/1973 | Johnstone ............. F16K 3/0281 |
| D248,824 | S | 8/1978 | Imai ............................... D8/387 |
| D256,947 | S | 9/1980 | Terrazas |
| 4,326,557 | A | 4/1982 | Behle ........................ F16K 1/02 |
| D265,174 | S | 6/1982 | Boyle ............................ D8/387 |
| D273,460 | S | 4/1984 | Sturm ........................... D8/387 |
| 4,532,957 | A * | 8/1985 | Battle .................... F16K 3/316 |
| | | | 137/375 |
| D289,915 | S | 5/1987 | Beltran |
| 4,679,770 | A | 7/1987 | Liberman ............. F16K 3/0281 |
| 4,928,919 | A | 5/1990 | Daicho ................... F16K 1/302 |
| D310,956 | S | 10/1990 | Huska ........................... D8/387 |

(Continued)

OTHER PUBLICATIONS

Office Action issued in U.S. Appl. No. 29/693,097 dated Jun. 1, 2020 (27 pgs).
U.S. Appl. No. 29/693,097, filed May 30, 2019, Villanueva.

*Primary Examiner* — Kelsey E Cary
(74) *Attorney, Agent, or Firm* — Hayes Soloway P.C.

(57) ABSTRACT

A new design for a gate valve comprises a rotating shaft with a head that can be mated to a drill bit, allowing the valve to be operated by use of a powered rotary tool such as an impact drill rather than the more difficult, traditional manual wheel or wrench. The shaft rotates freely while remaining mated to the gate valve, which in turn moves up or down to open or close the valve.

14 Claims, 7 Drawing Sheets

(56) References Cited

U.S. PATENT DOCUMENTS

| | | | |
|---|---|---|---|
| D318,316 S | 7/1991 | Hengesbach | |
| 5,269,340 A | 12/1993 | Drzewiecki | F16L 41/065 |
| D352,656 S | 11/1994 | Rodman | D8/385 |
| D353,147 S | 12/1994 | Bergman | |
| D353,562 S | 12/1994 | Ewers | |
| 5,370,149 A | 12/1994 | Clarkson | F16K 3/0281 |
| D368,019 S | 3/1996 | Ohtsuka | D8/387 |
| 5,653,423 A * | 8/1997 | Young | F16K 3/0227 251/326 |
| 5,657,961 A * | 8/1997 | Kalsi | F16K 3/12 251/324 |
| 5,722,450 A * | 3/1998 | Julicher | E03B 9/06 137/296 |
| 5,829,734 A * | 11/1998 | Freudendahl | F16K 3/02 137/375 |
| 5,979,874 A | 11/1999 | Gambetta | F16K 3/0281 |
| 5,992,440 A * | 11/1999 | Betz | F16K 31/508 137/15.18 |
| D426,766 S | 6/2000 | Burchall | D8/387 |
| D434,148 S | 11/2000 | Trocar | |
| D446,219 S | 8/2001 | Miyoshi | |
| 6,422,535 B1 | 7/2002 | Stone | F16K 3/0227 |
| D499,010 S | 11/2004 | Velten | D8/387 |
| D536,100 S | 1/2007 | Svedberg | |
| D563,216 S | 3/2008 | Suehiro | D8/387 |
| D576,027 S | 9/2008 | Lanz | D8/387 |
| D585,730 S | 2/2009 | Fernandez | D8/387 |
| D589,786 S | 4/2009 | Suehiro | D8/387 |
| D590,703 S | 4/2009 | Suehiro | D8/387 |
| D592,043 S | 5/2009 | Suehiro | D8/387 |
| 7,537,198 B2 * | 5/2009 | Petersen | F16K 3/0272 251/329 |
| D614,941 S | 5/2010 | Murphy | D8/387 |
| D631,736 S | 2/2011 | You | F16B 37/045 |
| D639,152 S | 6/2011 | Watts | D8/387 |
| D698,634 S | 2/2014 | Oetlinger | D8/387 |
| D757,900 S | 5/2016 | Yakushijin | D23/233 |
| D779,930 S | 2/2017 | Chen | D8/387 |
| 10,060,115 B2 | 8/2018 | Miller | E03D 11/17 |
| D842,084 S | 3/2019 | Roebrugh | D8/382 |
| D847,595 S | 5/2019 | Hampton | D8/14 |
| D854,919 S | 7/2019 | Villanueva | D8/387 |
| 2003/0062502 A1 | 4/2003 | Knobbe | F16K 3/0254 |
| 2004/0217319 A1 | 11/2004 | Reeves | F16K 3/0227 |
| 2005/0098756 A1 * | 5/2005 | Gravningen | F16K 3/0227 251/329 |
| 2005/0173667 A1 | 8/2005 | Zheng | F16K 3/0254 |
| 2006/0118380 A1 * | 6/2006 | Aeberhard | B25B 23/141 192/56.61 |
| 2006/0237681 A1 | 10/2006 | Petersen | F16K 3/272 |
| 2007/0251579 A1 | 11/2007 | Weide | F16L 29/00 |
| 2009/0232619 A1 | 9/2009 | Baumgartner | F16B 25/0021 |
| 2010/0264350 A1 | 10/2010 | Langmesser | F16K 3/0227 |
| 2011/0001076 A1 | 1/2011 | Sidler | F16K 3/263 |
| 2011/0083747 A1 * | 4/2011 | Orino | C10B 25/10 137/1 |
| 2013/0180612 A1 | 7/2013 | Morrison | F16K 31/50 |
| 2014/0332707 A1 | 11/2014 | Reilly | F16K 3/0281 |
| 2015/0308083 A1 * | 10/2015 | Qingwei | F16K 37/0058 137/556 |
| 2016/0138721 A1 | 5/2016 | Burgess | F16K 3/02 |
| 2016/0327198 A1 | 11/2016 | Sundrla | F16K 31/504 |
| 2017/0016551 A1 | 1/2017 | Villanueva | F16K 31/50 |
| 2017/0067573 A1 | 3/2017 | Herman | F16K 31/508 |
| 2018/0180186 A1 | 6/2018 | Kim | F16K 3/312 |
| 2018/0281029 A1 | 10/2018 | Maichel | F16K 43/001 |
| 2018/0363786 A1 | 12/2018 | Sundrla | F16K 27/044 |

* cited by examiner

POWER-DRIVEN GATE VALVE

BACKGROUND

The standard gate valve is used in mines, factories, power plants, and other places all over the world. The gate is designed to start or stop the flow of fluids and slurries, and more rarely to regulate flow rate. The working component of the gate is a plane or wedge which slides into place perpendicular to the flow within a pipe valve. When lowered, the plane blocks the flow; when raised, the plane allows the fluid to flow unrestricted. When a gate valve is used to regulate the flow, partially raising or lowering the gate will change flow rate.

In the prior art, a typical example of a gate valve is lowered by turning a wrench or handle about a threaded shaft. The handle is mated to a rotatable bushing and threaded nut in such a way that the handle does not move up or down. The threaded shaft is mated to the gate such that it cannot rotate; as a result, turning the handle causes the shaft to raise or lower rather than rotating; the rotating wheel or wrench is not raised or lowered during normal operation. Due to cost or to conditions in the valve's environment, manually operated valves remain prevalent in the industry and will remain so for the foreseeable future. However, manually-operated valves face continuing problems due to the effort involved in their operation. Slurries and acids tend to foul working surfaces and shaft threads and make the valves increasingly difficult to operate. Even under normal conditions, turning the valves is a physically-demanding task that may take ten or fifteen minutes.

Mines in particular are sensitive to the problems of manual valves in conditions prohibitive to electric valves. Slurries contain sediments, acids, and other byproducts of the ore concentrate which can quickly foul a threaded shaft beyond use in the uncontrolled outdoor or underground environments common to mines. Industry practice is to simply replace the valves on a regular basis; as such, mines have the frequent opportunity to update their valve technology, but no new valves have been introduced which adequately address the problems of the current design. A heretofore unaddressed need exists for a device which can ameliorate these issues.

Figure 1:
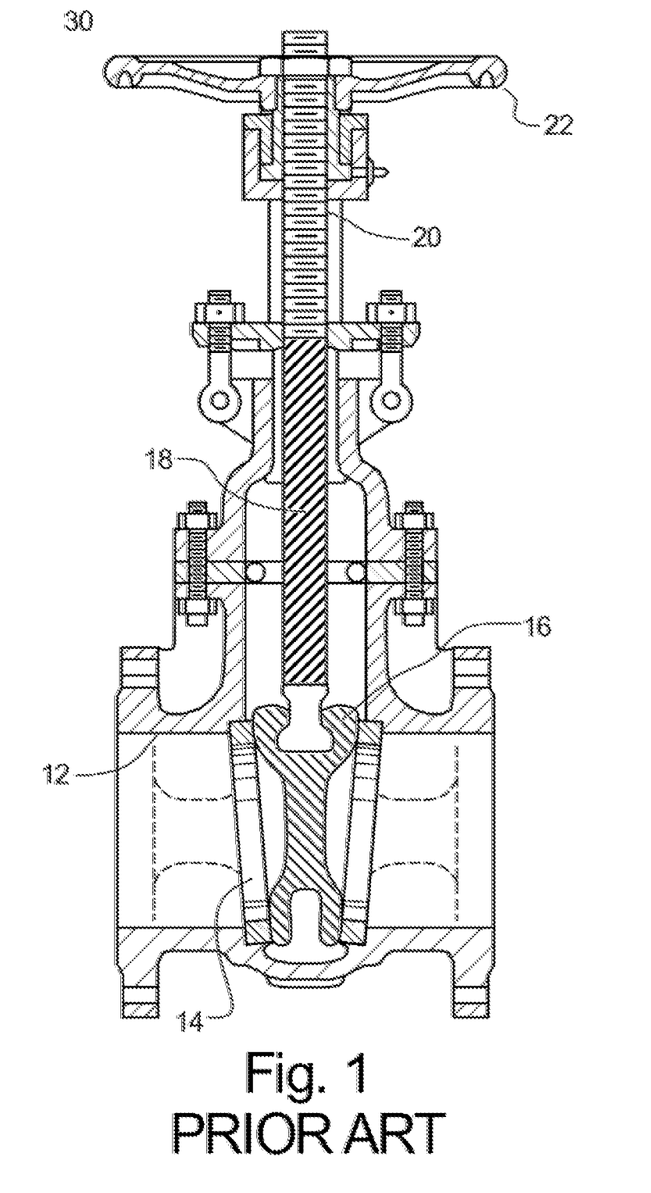
FIG. 1 represents a typical gate valve in the prior art.

FIG. 1 illustrates a cross-section view of a typical example of the prior art gate valve 30. The valve pipe 12 connects to surrounding pipes to allow fluids to flow. A gate block 14 permits or restricts flow within the valve pipe 12 through the prior art gate valve 30. The interior of the gate block 14 comprises a shaft lock 16 which grips the bottom of the shaft 18 and prevents said shaft 18 from rotating. A user applies rotational force to the handle 22. Said rotational force interacts with the threading 20 to create upward force on the shaft 18, which further translates to the gate block 14. This force opens and closes the valve.

Another example of prior art includes knife gates, which have a narrower gate blocking the flow through the valve but otherwise operates on a similar principle—the shaft does not rotate with the handle; rather, torque applied to the handle moves the shaft up and down with the gate. A typical example of a prior art knife gate comprises four struts supporting a threaded mount. The shaft passes through the threaded mount and extends down to the valve body where it immovably mates with the knife gate. A handle is mounted onto the shaft outside of the threaded mount; just like the gate valve, torque applied to the handle applies forces through the threading on the threaded mount and the threaded portion of the shaft to move the shaft and gate up or down without rotating the shaft.

Figure 2:
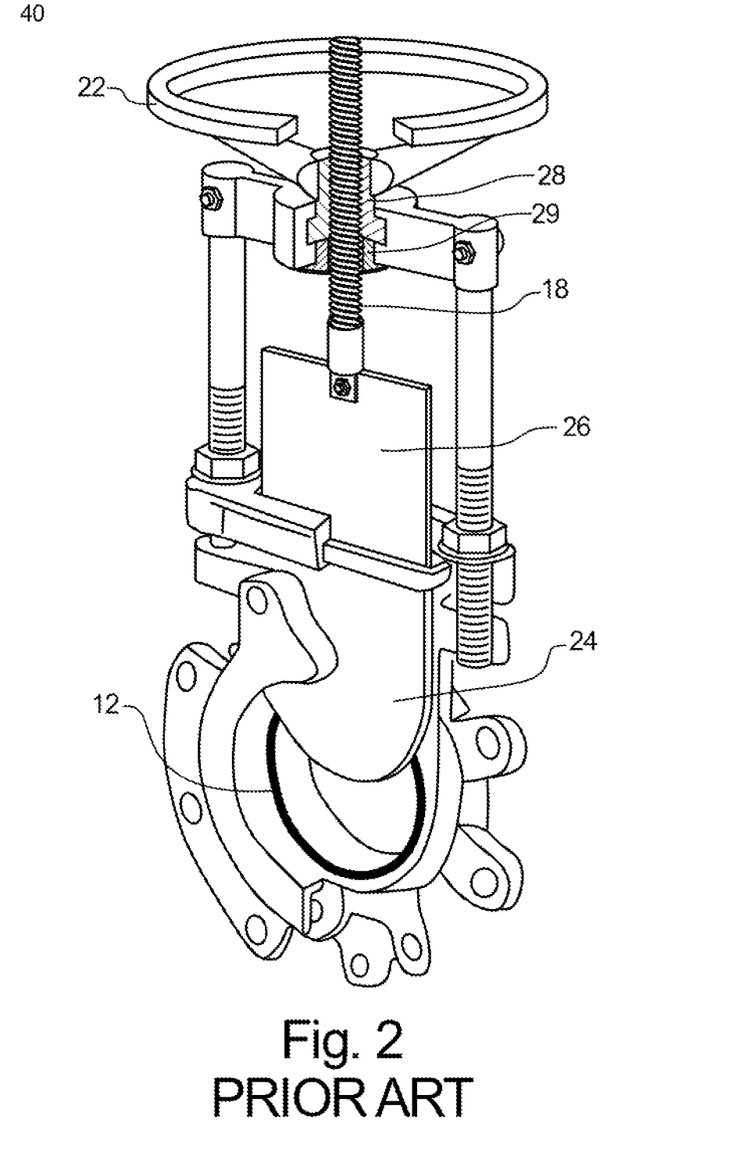
FIG. 2 represents a typical knife gate valve in the prior art.

FIG. 2 illustrates a typical example of a prior art knife gate valve 40. Like the prior art gate valve 30, this embodiment of the prior art comprises a handle 22, a threaded shaft 18, and a valve pipe 12. Instead of a gate block 14, this embodiment comprises a knife gate 24 joined to the shaft 18 by a coupling 26 which raises when the threaded shaft 18 is raised by the action of the handle 22 against the nut 28 and bushing 29.

SUMMARY

The power-driven gate valve presents a solution to the difficulties of turning these heavy valves. In the preferred embodiment, top end of the threaded shaft is a hexagonal head that can be mated with an attachment to a rotary tool. The preferred embodiment is designed for use with impact drills because that type of rotary tool can shake sediment and other impediments from the threads of the threaded shaft, but any sort of handheld drill or other rotary tool will suffice. The lower end of the shaft is reshaped with a rounded head that rotatably mates with the gate rather than remaining fixed.

In the preferred embodiment, the top of the shaft comprises a hex head which can be mated to an impact drill attachment. This tool gives the worker the ability to exert much greater power than the worker could exert by hand, but is not stationary like a built-in electric motorized valve. Impact drills are preferred over other types of rotary tools because the impact action will tend to loosen the valve's moving parts by shaking out corrosion or sediments. The ability to use a rotary tool such as an impact drill saves time and effort, increasing efficiency for mines and other facilities. In the event that an impact drill is unavailable, workers can still mate a wrench or wheel to the hex head and turn the shaft manually, so the present invention comprises no loss of function over the old technology. However, unlike the typical prior art, the wheel in the present invention will be raised and lowered during operation as the hex head of the shaft rises or falls.

The bottom of the threaded shaft and the top of the gate are configured to rotatably mate with one another. In the preferred embodiment, the lower end of the threaded shaft comprises a round section at the bottommost end of the threaded shaft. Above the bottommost end is a section of the shaft with a smaller diameter than the rest of the shaft. The gate is shaped with a cutout slot around its perimeter; the cutout slot at its narrowest is preferably slightly wider than the round section of the threaded shaft. The cutout slot is also preferably slightly wider at its widest than the maximum diameter of the threaded shaft. The threaded shaft's round section is mated to the cutout portion of the plane such that the shaft can rotate and apply upward or downward force to the plane. When the threaded shaft rotates in its housing, it travels up or down according to its direction of rotation. The gate is restricted to upward or downward motion within its frame. When the two parts are mated together, the threaded shaft's rotation raises or lowers both the shaft and the gate within the valve. The threads of the threaded shaft interact with threads in the fixed shaft bushing rather than in a rotatable bushing, handle, and nut. As a result of this design, the shaft rotates as it moves up and down against the threads of the bushing. This action stands in contrast to the prior art where a shaft moves up and down without rotating and all rotational force is directed up and down by the threading on a non-rotating shaft mated to a plane, said plane being free to move only up or down. The use of a rotating shaft in the preferred embodiment of the present invention enables the use of the hex head and impact drill components described above. Without the features of the present invention, use of a handheld drill is impractical.

An alternate embodiment of the powered gate valve is a powered knife gate valve. The powered knife gate valve comprises a thin knife gate and a thin housing to stop or regulate fluid and slurry flow through the pipe. As with the gate valve, the knife gate valve comprises a shaft and is designed such that said shaft rotates. The bottom portion of the shaft rotatably mates with the top portion of the knife gate. In the prior art, the shaft is fixed to the knife gate. In contrast, this embodiment of the present invention encloses the bottom portion of the shaft in a coupling, said coupling comprising two parts which are fixed to the knife gate. The shaft can rotate freely within the coupling but cannot be separated from said coupling without first disassembling the coupling.

Further alternate embodiments may fashion the hex head with a different number of sides; for example, a four-sided square head, or a five-sided pentagonal head. More sides tend to increase the head's durability, while fewer sides tend to make the head easier to torque. The hex head remains the preferred embodiment both for its balance of durability and torque and in order to make the present invention compatible with existing tool bits.

Yet further alternate embodiments would incorporate the rotating threaded shaft, hex head, and any variants thereof into the designs of other types of gate valves such as globe valves, ball valves, butterfly valves, and others.

The foregoing and other features and advantages of the power-driven gate valve will be apparent to those of ordinary skill in the art from the following more particular description of the invention and the accompanying illustrations.

DESCRIPTION OF THE EMBODIMENTS

Figure 3:
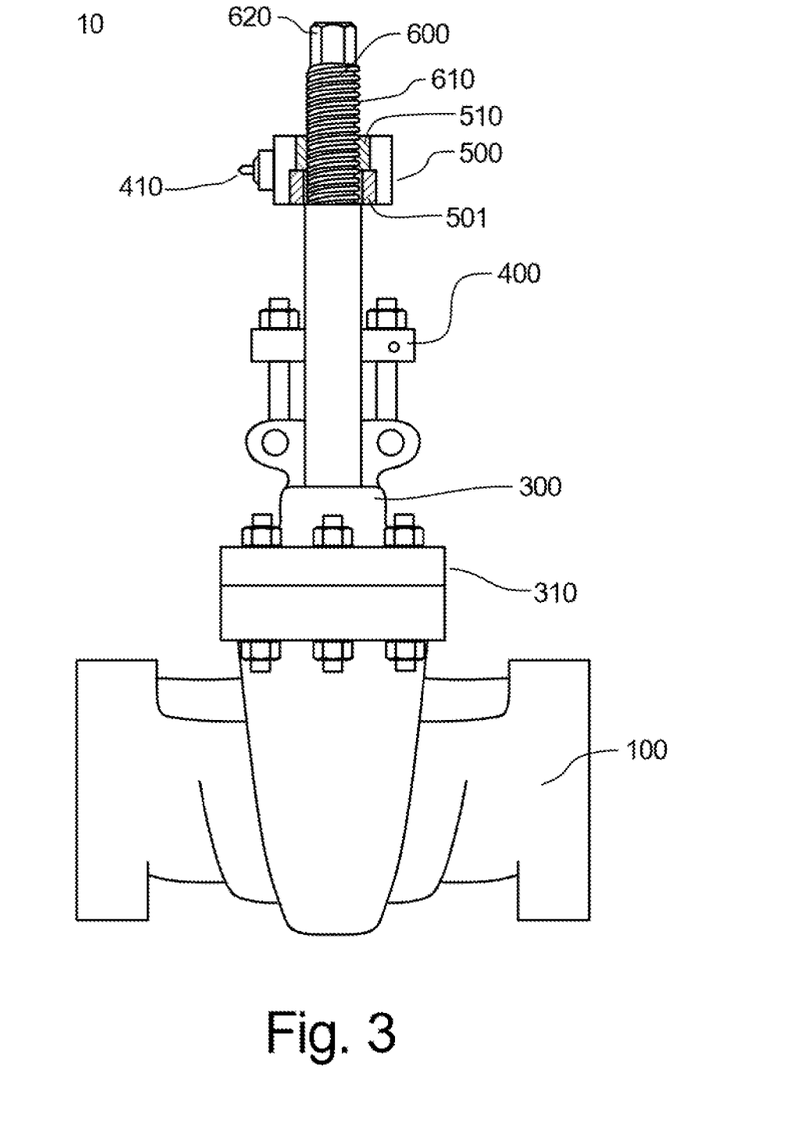
FIG. 3 is side view of the preferred embodiment of the power-driven gate valve.

FIG. 3 represents a side view of the preferred embodiment of the power-driven gate valve 10. The pipe 100 is fitted to an existing pipeline where it is necessary to stop and start flow or, less commonly, to regulate flow rate. The gate 200 lies with the pipe 100. The valve attachment 300 directly above the gate 200 is secured in place by a bonnet 310. Directly above the valve attachment 300 is the packing box 400, and above that is the bushing 501 which is located in the yoke 500. The yoke 500 also contains the fixed threading 510 which interacts with the working threads 610 of the threaded shaft 600. The fixed threading 510 remains fixed in place during normal operation of the power-driven gate valve 10. At the top end of the threaded shaft 600 is the top portion 620, preferably embodied as a hex head compatible with an impact drill bit. The preferred embodiment further comprises grease inserts 410 near the moving parts.

Figure 4:
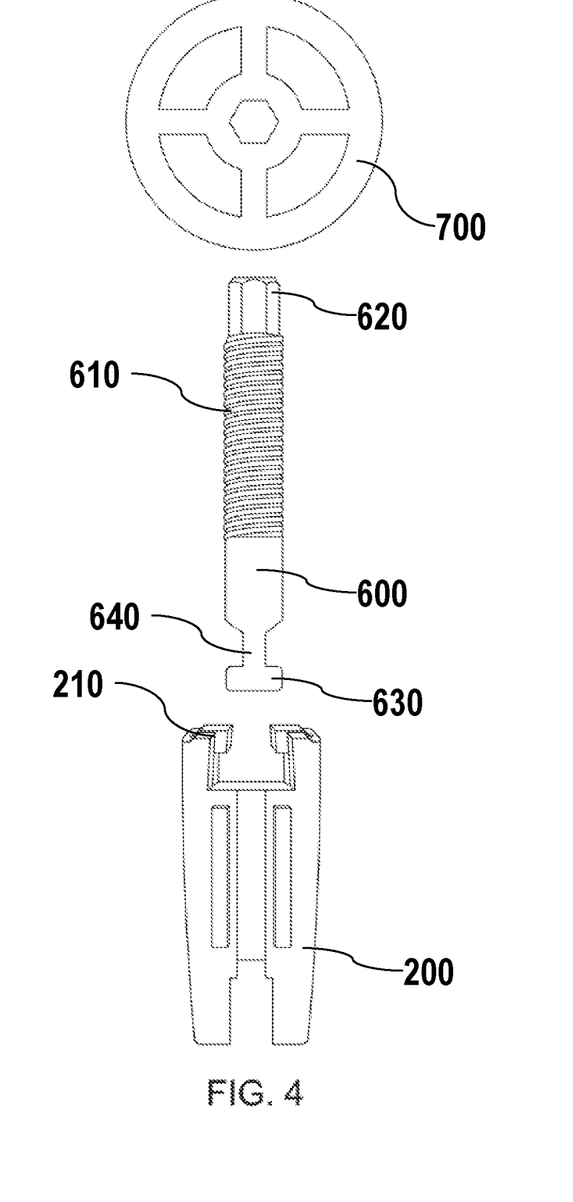
FIG. 4 is a detail view of the threaded shaft and gate block.

FIG. 4 represents the gate 200, threaded shaft 600, and wheel 700. The gate 200 lies entirely within the body of the power-driven gate valve 10, while the threaded shaft 600 partially emerges during operation. The wheel 700 remains outside the body of the power-driven gate valve 10 at all times; in fact, the wheel 700 can be removed entirely in some embodiments, though doing so is not necessary even in order to use a powered rotary tool as intended. The top portion 620 of the shaft mates with the wheel 700 or with a powered rotary tool. When the threaded shaft 600 rotates, working threads 610 of the threaded shaft 600 push against the fixed threading 510 to raise and lower the threaded shaft 600 as well as the rotatably mated gate 200.

The threaded shaft 600 comprises a rounded bottom end 630 and rounded cutout 640 at its lower end. The rounded cutout 640 allows the rotatable mating of flanges 210 from the gate 200 in order to pull the gate 200 upward, while the rounded bottom end 630 presses directly on the gate 200 in order to push the gate 200 downward. The flanges 210 may include planar sidewalls on the sides of the gate 200. The flanges 210 may be spaced apart from one another along an axis orthogonal to a flow within the pipe 100. This spacing may allow a user to slide the rounded bottom end 630 of the threaded shaft 600 into or out of the flanges 210 in the direction orthogonal to a flow within the pipe 100 when the threaded shaft 600 and the gate 200 are not assembled within the gate valve 10.

Figure 5:
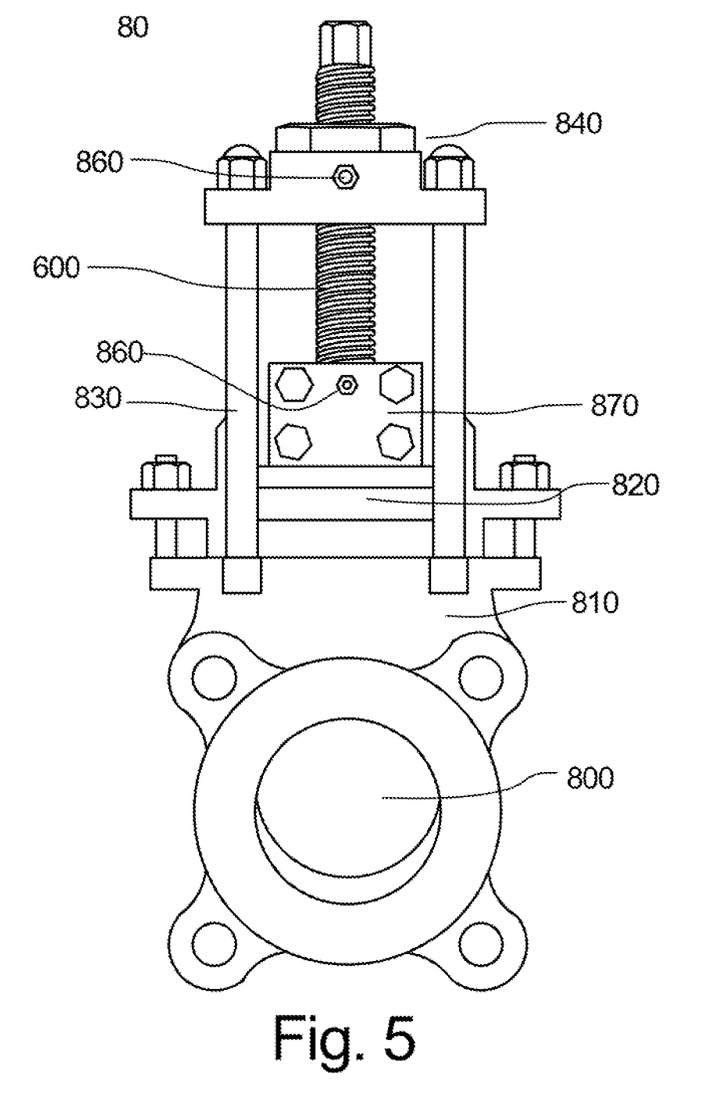
FIG. 5 is a front perspective view of the knife gate valve alternate embodiment.

An alternate embodiment of the present invention is the knife gate valve 80 shown in FIG. 5. A knife gate 800 rests within a frame 810. When open, the knife gate 800 is withdrawn through a packing box 820. The packing box 820 rests between a plurality of yokes 830 which support a threaded bushing 840. Said threaded bushing 840 mates with the threaded shaft 600, preferably one identical to the preferred power-driven gate valve 10 embodiment of the present invention including its rounded bottom end 630 and rounded cutout 640 (not shown), such that the threaded shaft 600 moves up or down as it rotates. A grease insert 860 on the threaded bushing 840 enables easier maintenance such that the threaded shaft 600 continues to move easily and smoothly. Below the threaded bushing 840, he threaded shaft 600 rotatably mates with a coupling 870 which is immovably fixed to the knife gate 800. Said coupling 870 preferably comprising two halves immovably mated to one another around the threaded shaft 600.

Figure 6:
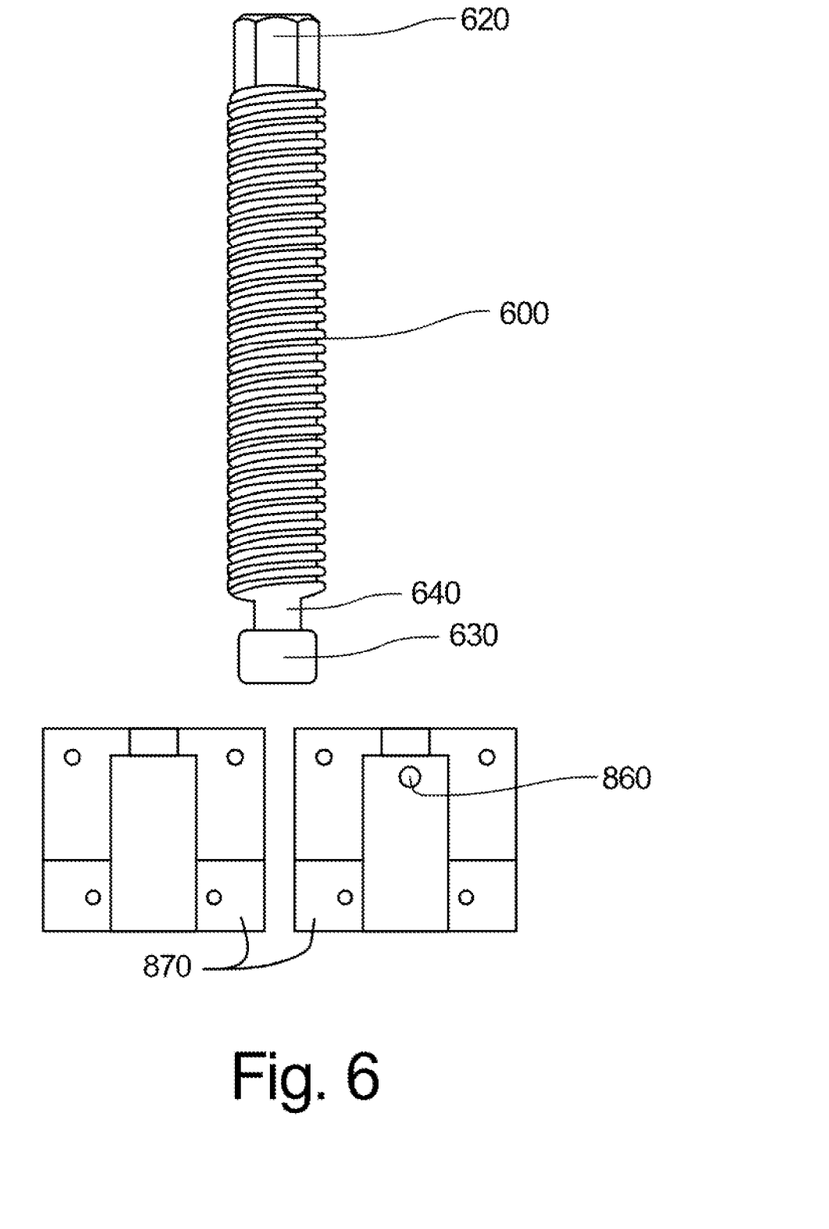
FIG. 6 is a detail view of the threaded shaft and coupling of the knife gate valve alternate embodiment.

FIG. 6 shows a view of the thread shaft 600 and disassembled halves of the coupling 870 for the knife gate valve 80 alternate embodiment. The rounded bottom end 630 and rounded cutout 640 are shown.

The top portion 620 is also visible in its preferred hex shape. The two halves of the coupling 870 preferably comprise a grease insert 860 to maintain the smooth movement of the threaded shaft 600.

Figure 7A:
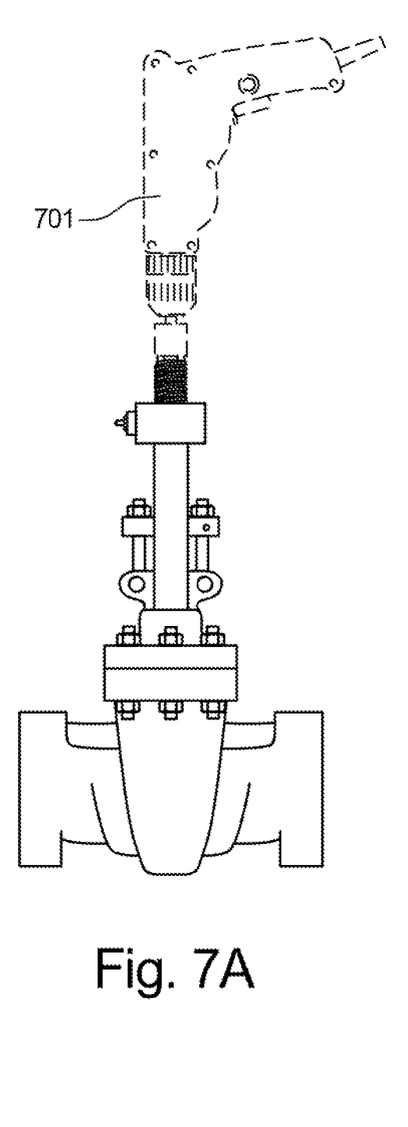
FIGS. 7A-7B show the use of a power drill and impact drill to operate the power-driven gate valve.
Figure 7B:
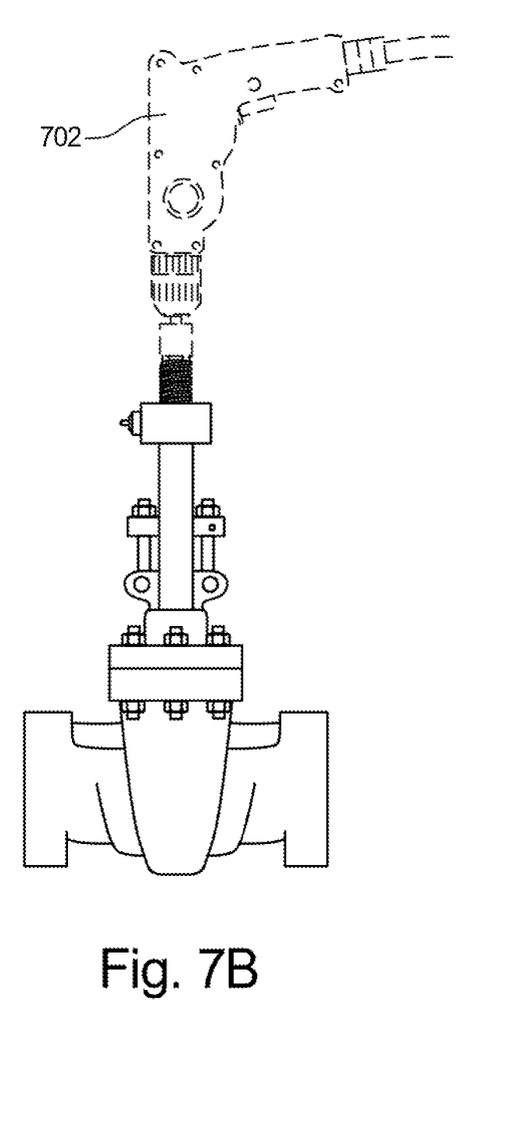

FIGS. 7A-7B show the use of a power drill 701 and impact drill 702 to operate the power-driven gate valve.

The embodiments of the present invention described above, particularly the preferred embodiments, merely set forth a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed:

1. A power driven gate valve comprising:
a gate within said gate valve that is movably embedded to constrict or permit flow, said gate having at least first and second flange portions positioned substantially opposite one another along first and second sides of the gate, respectively, and located at a top end of the gate, the at least first flange portion having a planar sidewall extending across an exterior portion of the first side of the gate, the at least second flange portion having a planar sidewall extending across an exterior portion of the second side of the gate, wherein the sidewalls of the at least first and second flange portions are spaced apart from one another along an axis parallel to a flow within a pipe, wherein the at least first and second flange portions form a ceiling portion of the gate, and wherein the at least first and second flange portions are separated by a spaced distance;
a shaft with shaft threading on at least part of said shaft, the shaft having an elongate axis;
said shaft having a bottom portion with a rounded cutout near one end, wherein a diameter of the rounded cutout is narrower than the spaced distance, and wherein the diameter of the rounded cutout is narrower than a diameter of the rest of the shaft;
said shaft having a top portion, wherein said top portion is a head having at least six flat sides;
said shaft being rotatably engageable to said gate against the ceiling portion of the at least first and second flange portions on at least two portions of the bottom portion separated by the spaced distance, wherein the bottom portion is constrained from moving vertically outside of the gate by the at least first and second flange portions;
said rounded cutout rotatably fits into a slotted gate cutout formed by the at least first and second flange portions;
said rounded cutout is slidably removable from the slotted gate cutout in a direction orthogonal to the elongate axis of the shaft when the shaft and gate are not assembled within the gate valve;
a yoke rigidly attached to said gate valve;
a threaded shaft bushing disposed inside said yoke and rigidly attached to said yoke; and
said threaded shaft bushing is disposed on said shaft threading.

2. The valve of claim 1, wherein the gate is monolithic.

3. A power-driven gate valve, comprising:
a gate having at least first and second flange portions positioned substantially opposite one another along first and second sides of the gate, respectively, and located at a top end of the gate, the at least first flange portion having a planar sidewall extending across an exterior portion of the first side of the gate, the at least second flange portion having a planar sidewall extending across an exterior portion of the second side of the gate, wherein the sidewalls of the at least first and second flange portions are spaced apart from one another along an axis parallel to a flow within a pipe, wherein the at least first and second flange portions form a slot leading to a rounded cutout within the gate, wherein the at least first and second flange portions form a ceiling portion of the gate, and wherein the at least first and second flange portions are separated by a spaced distance;
a shaft, having an elongate axis and comprising:
a top end shaped to engage with a rotational tool,
a threaded portion below the top end,
a neck below the threaded portion, the neck having a diameter narrower than the rest of the shaft and narrower than the spaced distance, and
a rounded bottom connected to the neck and located at a terminating end of the shaft within the rounded cutout, wherein the rounded bottom is rotatably engageable against the at least first and second flange portions on at least two portions of the rounded bottom separated by the spaced distance, wherein the rounded bottom is constrained from moving vertically out of the rounded cutout by the at least first and second flange portions, and wherein the rounded bottom is slidably removable from the rounded cutout in a direction orthogonal to the elongate axis of the shaft when the shaft and gate are not assembled within the gate valve; and
a yoke located around the shaft, the yoke having internal threading, wherein the shaft and the yoke are threadably connected to engage vertical movement of the shaft and the gate within the pipe.

4. The valve of claim 3, wherein a top surface of the at least first and second flange portions is beveled, and wherein a corresponding surface of the shaft is contoured to match the bevel.

5. The valve of claim 3, wherein the at least first and second flange portions extend inward toward the neck.

6. The valve of claim 3, wherein the gate is a wedge.

7. The valve of claim 3, wherein the rotational tool is an impact drill.

8. The valve of claim 3, wherein the shaft is constrained in a direction orthogonal to a flow of the valve pipe in operation with the gate valve.

9. The valve of claim 3, wherein the gate is monolithic.

10. A power-driven gate valve, comprising:
a knife gate;
a coupling in mechanical communication with the knife gate, the coupling comprising two recessed halves removably fixable together along a vertical plane, wherein each recessed half comprises a first cutout located above and in communication with a second cutout, wherein a depth of the first cutout is smaller than a depth of the second cutout, and wherein the knife gate is fixed to the coupling between a lower end of the two recessed halves;
a shaft, comprising:
a top end shaped to engage with a rotational tool,
a threaded portion below the top end,
a neck below the threaded portion, the neck having a diameter narrower than a diameter of the rest of the shaft and slidably located within the first cutout, and
a rounded bottom below the neck and located within the second cutout, wherein the rounded bottom is rotatably engageable against an interior portion of the coupling formed by the second cutout; and
a plurality of yokes located around the shaft, the plurality of yokes supporting a threaded bushing, wherein the shaft and the threaded bushing are threadably connected to engage vertical movement of the shaft and the knife gate within a pipe.

11. The valve of claim 10, wherein the rotational tool is an impact drill.

12. The valve of claim 10, wherein the shaft is constrained in a direction orthogonal to a flow of the valve pipe in operation with the gate valve.

13. The valve of claim 10, wherein the knife gate is monolithic.

14. The valve of claim 10, wherein the first and second cutouts have a semi-cylindrical shape.

\* \* \* \* \*